Figure 1:
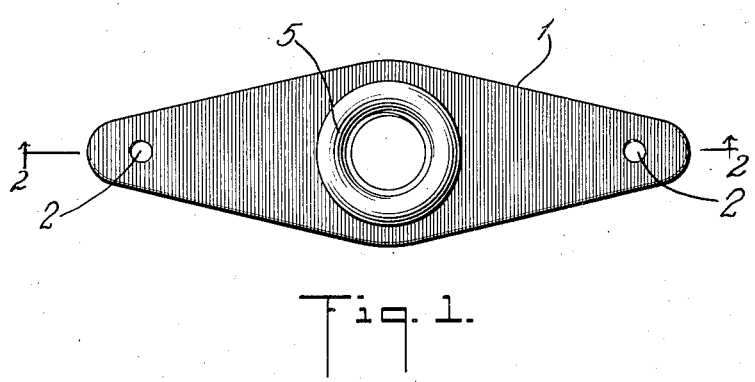

May 29, 1945.   R. W. LUCE   2,376,927

THREADED LOCKING DEVICE

Filed May 22, 1943

INVENTOR
Richard W. Luce
BY
George T. Gill
ATTORNEY

Patented May 29, 1945

2,376,927

UNITED STATES PATENT OFFICE 2,376,927

THREADED LOCKING DEVICE

Richard W. Luce, Southport, Conn.

Application May 22, 1943, Serial No. 488,028

2 Claims. (Cl. 151—21)

The invention herein disclosed relates to a threaded locking device of the kind in which two axially spaced threaded portions have threads of like pitch and are normally maintained by a resilient portion with the threads thereof axially displaced out of phase.

An object of this invention is to provide a threaded locking device of this kind that is light in weight; simple in construction and reliable in service. Another object of the invention is to provide a threaded locking device of this kind that is constructed from sheet metal.

The foregoing objects and certain advantages that will hereinafter appear are realized in the embodiment of the invention illustrated in the accompanying drawing and described in detail below.

Figure 2:
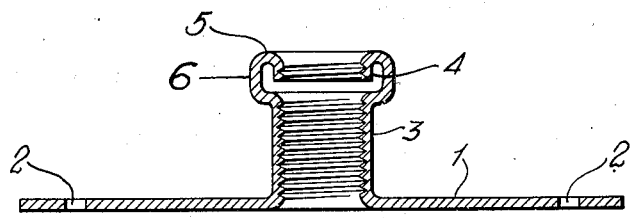

The drawing includes:

Fig. 1 which is a plan view of a so-called anchor nut embodying the invention; and Fig. 2 which is a transverse section of the same taken on the line 2—2 of Fig. 1.

The nut illustrated in the drawing is of the type known as an anchor nut and is commonly riveted to a structural member with the nut axially in line with an opening through the member. For this purpose, the nut is provided with a flange 1 which forms the face of the nut. The flange has spaced openings 2 therethrough through which the nut is secured to a structural member.

The nut proper consists of a tapped tubular body portion 3, an axially spaced, smaller, tapped, tubular portion 4, and a resilient portion 5 uniting the two tapped or threaded portions and normally maintaining the threaded portions with the threads thereof out of phase toward each other. The entire nut is preferably made from sheet metal and the body portion 3 has a wall section that is relatively thin and of substantially uniform thickness. The flange 1 extends radially from one end of the body portion.

At the opposite end of the body portion, there is a tubular portion 6 of greater diameter than the body portion. The end portion of this tubular portion 6 is rolled inwardly to form the smaller tubular portion 4 axially alined with, spaced from and of the same diameter as the body portion. In rolling the edge inwardly, the curved resilient portion 5 is also formed.

A nut blank so formed is next tapped. The tap is run through both the body portion 3 and the smaller tubular portion 4 so that a thread of the same pitch is formed in each of these portions. The thread formed in the body portion constitutes the load-carrying thread. After the threads have been formed in the body and spaced, smaller, tubular portions, the nut is compressed to cause the resilient portion to take a set with the thread of the smaller tubular portion out of phase with the thread of the body portion and in a direction towards the body portion and in an amount slightly less than one-half the pitch of the thread.

With this arrangement, a bolt first enters the body portion in threaded engagement therewith and passes therethrough. When it engages the smaller tubular portion, it is necessary for it to displace this portion, against the action of the resilient portion, to bring the thread thereof into coincidence with its own thread. The resilient portion exerts a force to effect a surface engagement of the thread of the bolt and the thread of the body portion. The surface friction thus effected is sufficient to resist forces tending to effect relative rotation of the nut and bolt resulting from vibration and shock ordinarily encountered in service.

It will be obvious that various changes may be made by those skilled in the art in the details of the embodiment of the invention illustrated in the drawing and described in detail above within the principle and scope of the invention as expressed in the appended claims.

I claim:

1. A threaded locking device of the kind described comprising in combination a threaded, tubular body portion having a wall of substantially uniform thickness, a flange at one end thereof forming the face of the device, a tubular portion at the opposite end of the body portion of larger diameter than the body portion and having the end thereof inturned in a smooth curve through an angle of substantially one hundred and eighty degrees to provide a smaller tubular portion axially spaced from the end of the body portion and of substantially the same diameter as the body portion, the smooth curved portion constituting a resilient portion adapted to partake of a bending action upon relative axial movement of the body and smaller tube portion, and a thread in the smaller tubular portion of like pitch as the thread of the body portion and normally positioned out of phase with the thread of the body portion in a direction towards the body portion.

2. A threaded locking device of the kind described consisting of a single piece of sheet metal and comprising in combination a threaded, tubular body portion having a wall of substantially uniform thickness, a flange at one end thereof forming the face of the device, a tubular portion at the opposite end of the body portion of larger diameter than the body portion and having the end thereof inturned in a smooth curve through an angle of substantially one hundred and eighty degrees to provide a smaller tubular portion axially spaced from the end of the body portion and of substantially the same diameter as the body portion, the smooth curved portion constituting a resilient portion adapted to partake of a bending action upon relative axial movement of the body and smaller tube portion, and a thread in the smaller tubular portion of like pitch as the thread of the body portion and normally positioned out of phase with the thread of the body portion in a direction towards the body portion.

RICHARD W. LUCE.